May 23, 1967     L. J. GANGELL     3,321,237

AUTOMOBILE WASTE RECEPTACLE

Filed Dec. 13, 1965

INVENTOR.

Lawrence J. Gangell

United States Patent Office 3,321,237
Patented May 23, 1967

3,321,237
AUTOMOBILE WASTE RECEPTACLE
Lawrence J. Gangell, 32 Wintonbury Ave.,
Bloomfield, Conn. 06002
Filed Dec. 13, 1965, Ser. No. 513,919
4 Claims. (Cl. 296—63)

This invention relates to waste disposing devices, and more particularly to an automobile waste receptacle.

It is therefore the main purpose of this invention to provide an automobile waste receptacle located under a seat of an automobile for disposing waste therein.

Another object of this invention is to provide an automobile waste receptacle wherein a tubular inlet is provided within the back rest of the automobile and adapted to receive the disposable matter for said receptacle.

Another object of this invention is to provide an automobile receptacle which can be easily removed for cleaning purposes.

Another object of this invention is to provide clamp for holding said receptacle firmly in place.

Another object of this invention is to provide an automobile receptacle bottom portion of which being positioned within a recess or cut-out which is located on the floor of an automobile beneath the seat.

A still further object of this invention is to provide an automobile receptacle which is inexpensive to manufacture and provides maximum utility to its user.

Other objects and advantages of this invention will become apparent from a consideration of the following detailed description take in connection with the accompanying drawing wherein a satisfactory embodiment of the invention is not limited to the details disclosed but includes all such variations and modifications as fall within the spirit of the invention and the scope of the appended claims.

Figure 1:
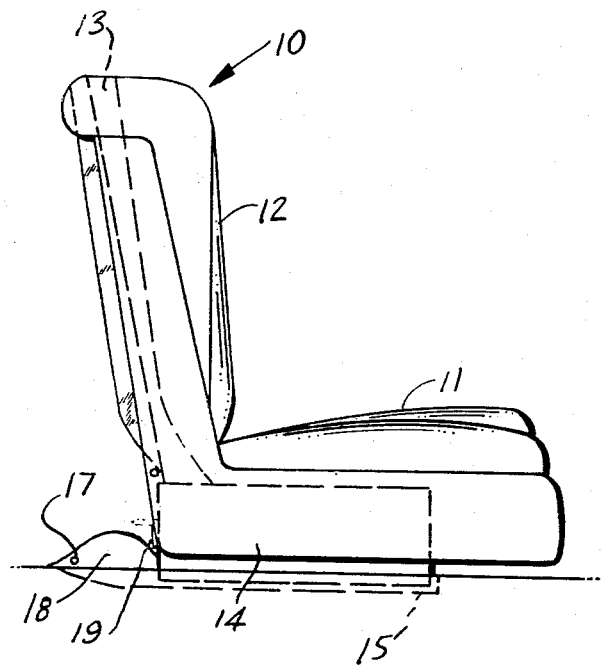
Figure 2:
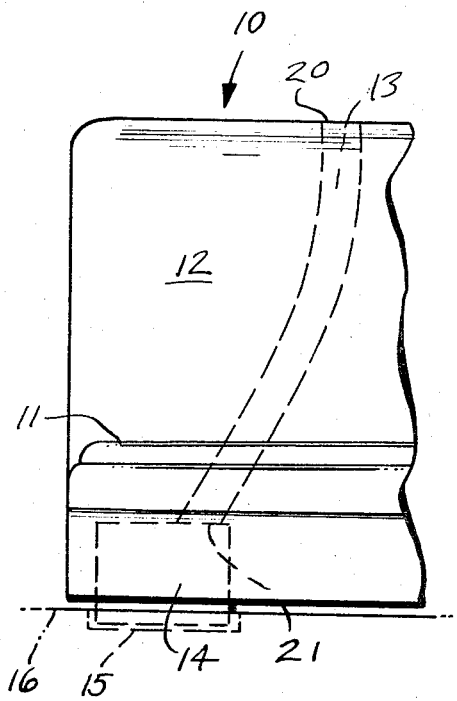
Figure 3:
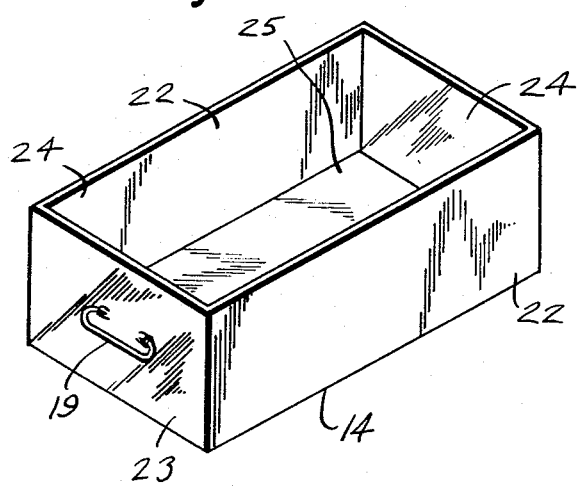

In the drawing:
FIGURE 1 is a side view of this invention;
FIGURE 2 is a front view of FIGURE 1;
FIGURE 3 is a perspective view of the receptacle shown removed from underneath the seat of an automobile.

According to this invention, back rest 12 of a passenger seat 11 is provided with a disposable tube 13 mounted within said back rest 12 in such a manner that the top portion 20 of said back rest is adapted for admitting disposable matter into said disposable tube 13. The bottom portion 21 of said tube is suitably positioned over the opening 24 of a rectangular waste receptacle 14. Said receptacle is provided with suitable end walls 22 and upwardly inclined wall 23 and rear wall 24. Bottom wall 25 is connected by any suitable means to all these previously mentioned walls, and over the walls are firmly affixed to one another. Front wall 23 is provided with a suitable, pivotable, handle 19 which is adapted for pulling the receptacle from beneath the seat 11. A cut-out or recess 15 is provided under the seat 11 for positioning said receptacle beneath seat 11. A suitable clamp 18 is provided to secure said receptacle in place. This is done by abutting the front end of clamp 18 to the front wall 23 of receptacle 14, thereby preventing cluttering within the receptacle within recess 15 when the automobile is traveling on rough road. Clamp 18 is pivotably or totably secured to the floor 16 by hinge means 17. Said hinge means can be of any suitable nature. If it is desired to remove the receptacle 14 for cleaning or removing waste, clamp 18 is lifted upwardly and the receptacle is removed by pulling handle 19.

As it can be seen from FIGURE 2 of the drawing, waste disposal tube 13 is not directly located above the receptacle but is disposed on an inclined angle. This is for preventing disposable items such as beer cans, bottle, etc. from directly falling into the receptacle and thereby causing great amount of noise. The inclined tube 13 reduces the falling speed of a disposable item and thereby considerably reducing impact noise when said item reaches bottom 25 of receptacle 14.

It will also be noted that receptacle 14 can be made of rubber-like material or a plastic substance to considerably reduce the sound effect. This type of receptacle is corrosion-proof and can be readily washed or cleaned.

What I now claim is:

1. An automobile receptacle located within the seat of an automobile comprising a vertical tube disposed within the back rest of said seat, a waste receptacle positioned beneath said seat, a cut-out in the floor of said automobile for the bottom portion of said receptacle, securing means for the front portion of said receptacle to prevent said receptacle from sliding within said cut-out when the automobile is traveling on rough roads.

2. An automobile receptacle according to claim 1 wherein said vertical tube is positioned at an inclined angle and is adapted to transmit disposable items into said waste receptacle.

3. An automobile receptacle according to claim 1 wherein said waste receptacle includes sidewalls, front and rear walls secured to said sidewalls, a bottom wall secured to said sidewalls and said front and rear walls, and a totable handle adapted to be secured to said front wall for substantially horizontal disposing of said waste receptacle.

4. An automobile receptacle according to claim 1 wherein said securing means include clamp being hingedly secured to said floor and when in a horizontal position adapted to secure said receptacle in place and prevent it from sliding when said automobile is traveling on rough roads and when said clamp is in a substantially vertical position said receptacle may be removed from beneath the seat and said cut-out.

References Cited by the Examiner

UNITED STATES PATENTS

| | | | |
|---|---|---|---|
| 2,703,426 | 3/1955 | Barkl | 297—191 |
| 3,131,813 | 5/1964 | Jensen | 297—192 |
| 3,188,134 | 6/1965 | Nixon | 296—69 |

BENJAMIN HERSH, Primary Examiner.

J. H. BRANNEN, Assistant Examiner.